United States Patent
McKay et al.

(10) Patent No.: US 11,125,499 B2
(45) Date of Patent: Sep. 21, 2021

(54) PROCESS FOR OPTIMIZING REMOVAL OF CONDENSABLE COMPONENTS FROM A FLUID

(71) Applicant: Gas Liquids Engineering Ltd., Calgary (CA)

(72) Inventors: N. Wayne McKay, Calgary (CA); James Maddocks, Calgary (CA)

(73) Assignee: DEXPRO CORPORATION, Calgary (CA)

( * ) Notice: Subject to any disclaimer, the term of this patent is extended or adjusted under 35 U.S.C. 154(b) by 81 days.

(21) Appl. No.: 15/789,694

(22) Filed: Oct. 20, 2017

(65) Prior Publication Data

US 2018/0045461 A1 Feb. 15, 2018

Related U.S. Application Data

(63) Continuation of application No. 15/350,960, filed on Nov. 14, 2016, now abandoned, which is a
(Continued)

(51) Int. Cl.
*F25J 3/06* (2006.01)
*B01D 53/00* (2006.01)
(Continued)

(52) U.S. Cl.
CPC ............ *F25J 3/065* (2013.01); *B01D 53/002* (2013.01); *B01D 53/265* (2013.01); *F25J 3/062* (2013.01);
(Continued)

(58) Field of Classification Search
CPC ...... F25J 3/067; F25J 2220/68; F25J 2220/60; F25J 2220/02; F25J 3/063; F25J 3/0209;
(Continued)

(56) References Cited

U.S. PATENT DOCUMENTS

| 6,301,927 B1 * | 10/2001 | Reddy | F25J 3/0209 |
| | | | 62/619 |
| 2006/0260468 A1 * | 11/2006 | Amin | B01D 53/265 |
| | | | 95/153 |

(Continued)

FOREIGN PATENT DOCUMENTS

| CA | 2315014 A1 | 6/1999 |
| GA | 2729329 A1 | 1/2011 |

(Continued)

OTHER PUBLICATIONS

Canadian Office Action for Application No. 2,790,182, dated Dec. 14, 2012.
(Continued)

*Primary Examiner* — Joseph F Trpisovsky
(74) *Attorney, Agent, or Firm* — Paul Sharpe; The Sharpe Group (57) ABSTRACT

A method for removing condensable components from a fluid containing condensable components. The method involves optimizing the temperature of an initial feed stream including the condensable components through heat exchange and cooling to condense liquids there from. The liquids are removed to form a gas stream which is then compressed and after-cooled to form a high pressure stream. A portion of the high pressure stream is expanded to form a cooled low pressure stream which is mixed with the initial feed stream to augment cooling and condensation of condensable components in the initial feed stream.

10 Claims, 8 Drawing Sheets

Related U.S. Application Data continuation of application No. 13/621,409, filed on Sep. 17, 2012, now abandoned.

(51) Int. Cl.
  *B01D 53/26* (2006.01)
  *F25J 3/08* (2006.01)

(52) U.S. Cl.
  CPC .......... *F25J 3/08* (2013.01); *B01D 2257/7022* (2013.01); *B01D 2257/80* (2013.01); *F25J 2220/66* (2013.01); *F25J 2220/68* (2013.01)

(58) Field of Classification Search
  CPC ...... F25J 3/062; F25J 3/065; F25J 3/08; F25J 1/0022; B01D 53/002; B01D 53/265; B01D 2257/7022; B01D 2257/80
  See application file for complete search history.

(56) References Cited

U.S. PATENT DOCUMENTS

| | | | | |
|---|---|---|---|---|
| 2006/0283207 A1* | 12/2006 | Pitman | ................... | F25J 3/0233 62/620 |
| 2011/0167867 A1* | 7/2011 | Mckay | ................. | B01D 53/265 62/617 |
| 2012/0167620 A1* | 7/2012 | Dorst | ................... | B01D 53/002 62/617 |

FOREIGN PATENT DOCUMENTS

| | | |
|---|---|---|
| GA | 2729329 C | 10/2011 |
| WO | 2006032139 A1 | 3/2006 |
| WO | 20100130781 A1 | 11/2010 |
| WO | 2011006242 A1 | 1/2011 |
| WO | 2012114119 A1 | 8/2012 |

OTHER PUBLICATIONS

Canadian Office Action for Application No. 2,790,182, dated Apr. 9, 2013.

Chinese Office Action for Application No. 201380048433, dated Nov. 24, 2015.

International Search Report and Written Opinion for International Application No. PCT/CA2013/001094, dated Apr. 28, 2014.

\* cited by examiner

PROCESS FOR OPTIMIZING REMOVAL OF CONDENSABLE COMPONENTS FROM A FLUID

TECHNICAL FIELD

The present invention relates to the removal of condensables from fluid mixtures exhibiting a positive Joule-Thomson effect, and more particularly the present invention relates to the removal of, for example, water from acid gas streams, for minimizing or substantially eliminating the formation of liquid water therein so as to minimize corrosion and formation of hydrates in the gas stream, transported and injected for sequestration. A discussion of retrofit and enhanced hydrocarbon recovery is also provided.

BACKGROUND ART

Gas streams, such as those which result from petroleum processing or combustion processes, often contain a gas or gases which form an acid when mixed with water. Such gases are typically called "acid gases". The most common naturally occurring acid gases resulting from petroleum processing are hydrogen sulfide ($H_2S$) and carbon dioxide ($CO_2$). Typical acid gases derived from combustion/oxidation/pyrolysis processes are carbon dioxide ($CO_2$), sulphur dioxide ($SO_2$), and nitrogen oxides ($NO$, $NO_2$).

Acid gases typically contain water. Naturally occurring acid gases are often saturated with water in the reservoir and combustion-derived gases co-exist with the water formed from the reaction of hydrogen and oxygen during combustion. Virtually all acid gases eventually end up being saturated with water vapour at some point during the process of removal or purification of the acid gas. Reducing the temperature or increasing the pressure, over a defined range, of an acid gas containing water, such as that which occurs when the acid gas is passed through a compressor, will result in the condensing of some of the water from a gas to a liquid phase. At some temperature, still above the freezing point of water, the water and acid gas may begin to firm a "solid like" structure called a gas hydrate. The temperature at which hydrates may begin to form is called the Hydrate Formation Temperature (HFT) which varies according to the pressure, composition and water content of the mixture. Hydrates are the physical combination of water and small molecules producing a compound having an "ice like" appearance, but possessing different properties and structure than ice. Hydrates may also be known as gas clathrate. Hydrates are problematic as they can cause reduced heat transfer, excess pressure drops, blockages, interruptions in production and are a safety concern.

The formation of an aqueous phase in any gas system is undesirable as it promotes corrosion, can cause gas hydrates to form and can cause mechanical and operational problems. An aqueous phase is particularly undesirable in an acid gas system as the resulting aqueous phase will be acidic, resulting in a significant increase in the corrosion rate and usually resulting in a higher HFT than non-acid gases.

Table A illustrates the levels of corrosion which occur in mild steel at varying concentrations of acid gas components in water.

TABLE A

Corrosion of Mild Steel by Carbon Dioxide and Other Gases in Water*

| $O_2$ conc. ppm | $H_2S$ conc. ppm | Corrosion mils/yr $CO_2$ conc, 200 ppm | Corrosion mils/yr $CO_2$ conc, 600 ppm |
|---|---|---|---|
| 8.8 | 0 | 28 | 60 |
| 4.3 | 0 | 18 | 44 |
| 1.6 | 0 | 12 | 34 |
| 0.4 | 0 | 17 | 27 |
| <0.5 | 35 | 6 | 6 |
| <0.5 | 150 | 15 | 16 |
| <0.5 | 400 | 17 | 21 |

*Temperature 80° F., exposure 72 hr.
Source: Data of Watkins and Kincheloe (1958) and Watkins and Wright (1953)

Although the discussion has focused on acid gas, it will be appreciated by those skilled that the methodology and concept is applicable for removing condensable components from any fluid stream exhibiting a positive Joule-Thomson coefficient.

SUMMARY OF TILE INVENTION

One object of one embodiment of the present invention is to provide a method for removing condensable components from a fluid containing said condensable components, comprising: optimizing the temperature of an initial feed stream including said condensable components through heat exchange and cooling to condense liquids there from and removing said liquids to form a gas stream; compressing and after-cooling said gas stream to form a high pressure stream; expanding at least a portion of said high pressure stream to form a cooled low pressure stream and mixing said cooled low pressure stream with said initial feed stream to augment cooling and condensation of condensable components in said initial feed stream.

Figure 1:
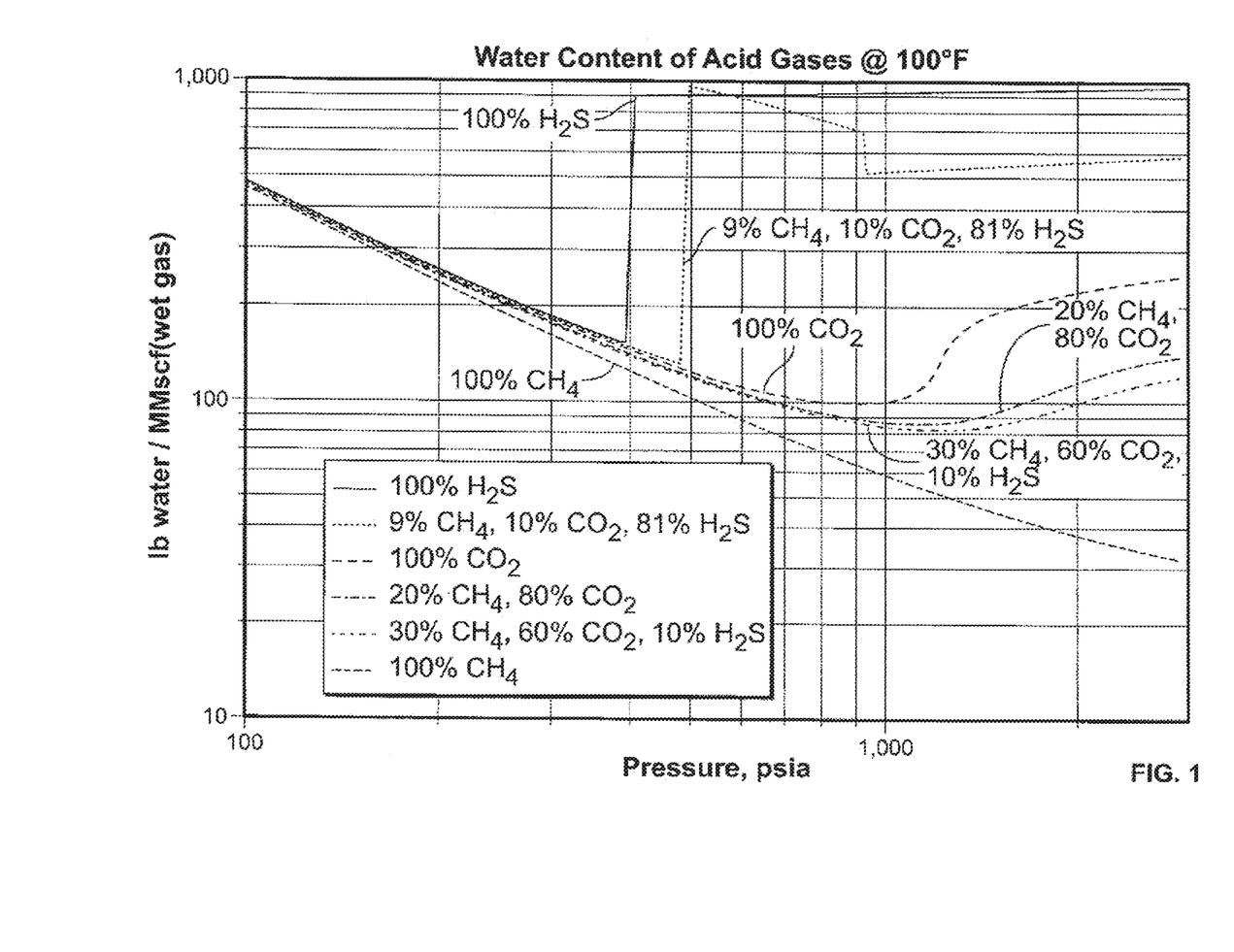
FIG. 1 is a graphical illustration of the saturated water content of various fluids, acid gases and methane ($CH_4$) at 100° F. over a range of pressures.
Figure 2:
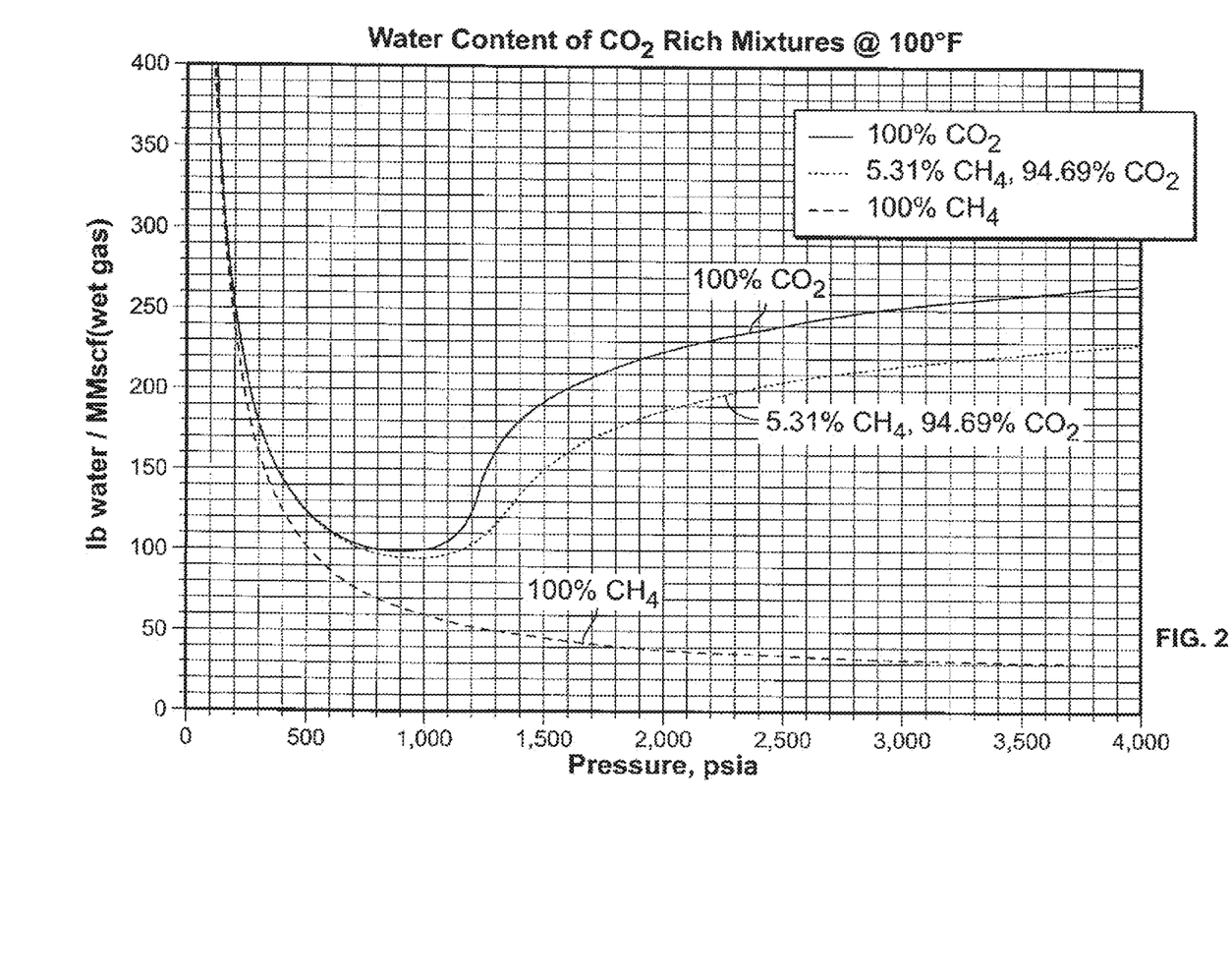
FIG. 2 is a graphical illustration of the saturated water content of $CO_2$-rich mixtures and methane ($CH_4$) at 100° F. over a range of pressures.
Figure 3:
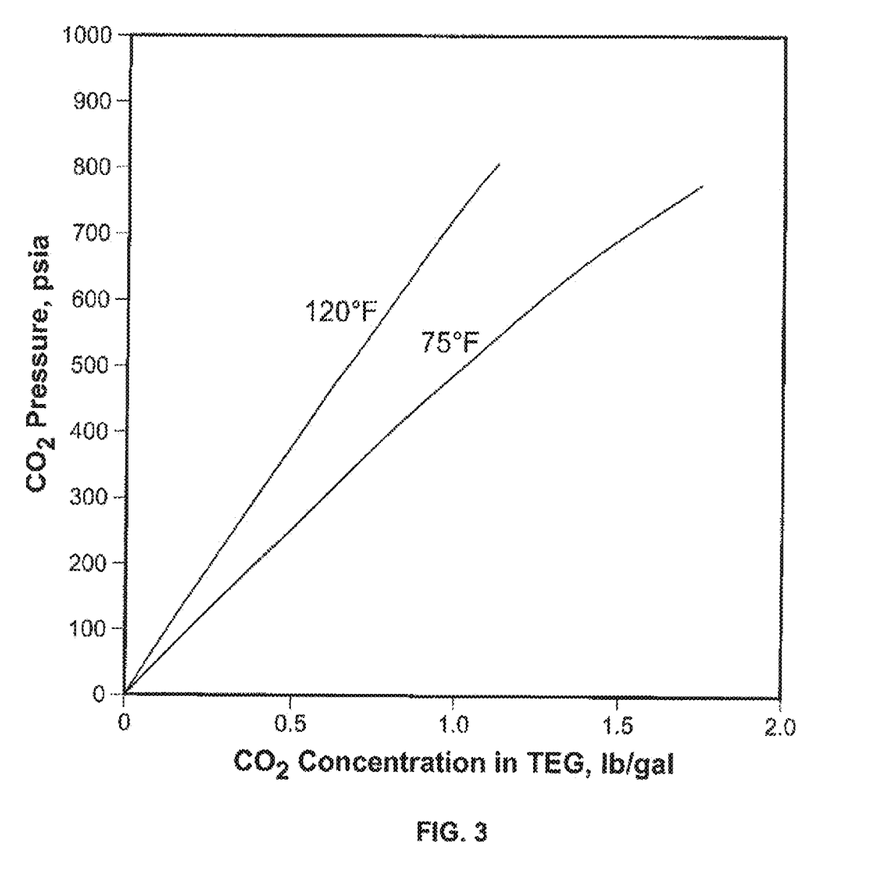
FIG. 3 is a graphical illustration of the glycol losses in a prior art high pressure $CO_2$ service.

Having reference to FIGS. 1 and 2, water content in an acid gas is proportional to temperature and up to about 400 psia for $H_2S$ and 900 psia for $CO_2$, is inversely proportional to pressure. Within these limits, higher pressures and lower temperatures favor low water content in acid gases.

Dehydration is the process of removing water so as to minimize or prevent hydrate and free water formation. In an acid gas with a relatively high $H_2S$ concentration, sufficient water is typically removed during cooling between stages of conventional multi-stage compression through to dense phase (some pressure above the critical pressure of the fluid also known as super critical) such that a separate dehydration process is not required. As the $CO_2$ content of the acid gas increases, sufficient water removal through compression alone becomes less likely and a separate dehydration process is usually required.

Conventional means of gas dehydration are solid desiccant adsorption, liquid desiccant absorption, refrigeration, membrane separation, and dry gas stripping. The most commonly used methods are solid desiccant adsorption and liquid desiccant absorption.

Glycol dehydration, a liquid desiccant absorption process, is generally regarded as the favored operational and most economical for most applications. Such liquid desiccant dehydration processes have several drawbacks:

- glycol losses in a high pressure $CO_2$ service can be significant;
- excess oxygen, typically found in combustion-formed acid gases significantly increases corrosion and accelerates the degradation of the glycol at higher regeneration temperatures, necessitating the addition of continuous glycol reclamation process;

glycol must be monitored and treated to maintain a proper pH range;

dehydration equipment is typically manufactured from high cost, corrosion resistant metals such as stainless steel to handle the acidic liquids produced;

glycol is typically heated to temperatures up to 400° F. for regeneration resulting in vaporizing of water and venting the absorbed acid gases to atmosphere and any other contaminants also absorbed by the glycol, such as volatile organic compounds (VOC's), typically benzene, toluene, ethyl benzene and xylene (BTEX) and any stripping gases. Control of these fugitive emissions generally requires the addition of costly vapor recovery equipment and introduces the potential for further oxygen contamination;

utility requirements of such processes are high and include the fuel used for glycol regeneration and the power required to pump the glycol and operate the vapor recovery equipment;

significant total carbon footprint is generated as a result of the manufacturing of the dehydration equipment, and the $CO_2$ produced from the utility demands of the system and of the formulation of the glycol used in the dehydration process.

Dehydration by refrigeration makes use of a gas's reduced ability to hold water as it's temperature is decreased. Temperature reduction can be achieved indirectly by heat exchange from external 'refrigeration' or other temperature reduction process, or directly by expansion of the gas itself. Direct expansion of the gas is either isentropic expansion such as in a turbo-expander or isenthalpic expansion, such as through a Joule-Thomson (JT) valve used in a conventional choke plant or through a gas compression refrigeration process. Installing a dedicated indirect refrigeration unit solely for the purpose of dehydration is typically cost prohibitive.

Both direct isenthalpic and isentropic refrigeration dehydration methods utilize an expansion device, a low temperature separator and at least one heat exchanger to recover as much energy from the process as possible. In their simplest form, the entirety of the gas is expanded, either isenthalpically or isentropically, from a higher pressure to a lower pressure, resulting in a fluid temperature low enough for water condensation to occur. The condensed water is removed from the process in a low temperature separator and the residual low temperature, substantially dry gas is used to pre-cool incoming fluid to improve the thermal efficiency of the process. This is typically referred to as a "Choke Plant" or "Dew Point Control Unit (DPCU)" in an upstream oil and gas processing application.

In the isentropic expansion case, expansion is accomplished with an expander and the work extracted by the expander is typically used to partially recompress the outlet dry gas.

The choice of whether to use isentropic or isenthalpic expansion is dependent upon the amount of water removal required, and therefore the amount of temperature reduction required. Isentropic expansion is capable of achieving lower temperatures. From a capital cost perspective, the isentropic process is significantly more costly, but the ability to recover work has an offsetting advantage. From an operation and maintenance perspective, the isenthalpic process has an advantage of being mechanically and operationally simple and suitable for most applications. The offsetting disadvantage of the isenthalpic process is the requirement to consume additional work through increased compression requirements.

The common drawback of any of the refrigeration dehydration processes is that most applications require the gas stream to be cooled to a temperature that is near or below the hydrate formation temperature (HFT) to achieve the desired level of dehydration. For reliable operation, continuous addition of a thermodynamic hydrate inhibitor, such as glycol or methanol, is usually employed to lower the HFT. If desired, both glycol and methanol are recoverable but require a separate regeneration process complete with all of the issues discussed earlier under liquid desiccant dehydration. Often the choice is made to use methanol without recovery as methanol is relatively benign and has less impact on downstream processes than glycol although this choice typically results in a higher operating cost. Interestingly, methanol not only is useful as the hydrate inhibitor, but also reduces the water content further than simple temperature reduction. In this manner, there is enhanced dehydration.

Clearly there is a need for a dehydration process for acid gas streams that is efficient and cost effective and which avoids the problems noted with conventional dehydration processes.

BRIEF DESCRIPTION OF THE DRAWINGS

The features of the invention will become more apparent in the following detailed description in which reference is made to the appended drawings wherein.

The examples provided assume steady state performance. Other considerations are addressed to accommodate start up, in service upsets, and shut down for commercial operations. One simple example is that during the first few minutes of start up, and during periods of external process upsets, the temperatures and slipstream flow rates may not be at the steady state operating condition dictated by the process design. Hydrates could potentially start forming without the provision of something in the design to mitigate this condition. Embodiments of the invention are therefore designed to include the capability of adding a thermodynamic hydrate inhibitor, such as methanol, for temporary protection against hydrate formation in an unsteady state performance.

Similar numerals used in the Figures denote similar elements.

DETAILED DESCRIPTION OF THE PREFERRED EMBODIMENTS

Embodiments of the invention take advantage of the thermodynamic property of typical acid gases that make them useful as a 'refrigerant'. Such gases exhibit a relatively large temperature reduction for a given pressure reduction within the operating region of the process. The large decrease in temperature is used to cool a slipstream of the feed stream which is thereafter recycled upstream for cooling the feed stream. In this manner, the method uses recycling to "auto-refrigerate". The Joule-Thomson effect is achieved by allowing the gas to expand isenthalpically through a throttling device, typically a control valve. No external work is extracted from the gas during the isenthalpic expansion. The rate of change of temperature with respect to pressure in a fluid is the Joule-Thomson (Kelvin) coefficient. For example, the Joule-Thomson (JT) Coefficient for carbon dioxide at 50° C. and 60 atm. is about 5.6 times greater than that of nitrogen at the same conditions. Therefore the temperature reduction for $CO_2$ would be about 5.6 times greater than for nitrogen for the same reduction in pressure at these conditions. JT Coefficient data is also available for $H_2S$, $SO_2$ and other acid gases, as well as for hydrocarbons, and inert gases, such as nitrogen and oxygen, that may be encountered.

Acid gases processed for commercial applications, such as Enhanced Oil Recovery (EOR) applications, or Carbon Capture and Sequestration (CCS) applications are normally compressed to super-critical pressures, commonly referred to as "dense phase", for transportation and/or sequestration. To reach dense phase, compression is normally accomplished in more than one stage, whether utilizing centrifugal, reciprocating, or shock compression, depending upon the initial pressure. The pressure differential between stages provides an opportunity to take advantage of the favourable JT Coefficient properties of the vapour.

Compression is broken into two distinct regions with respect to the critical point of the fluid being compressed. The stages of compression in the first region are sub-critical and the stages in the second region take the fluid above it's critical pressure and may be accomplished by compression and pumping means. An inlet stream enters the first region of compression, which is sub-critical, and is assumed to be water saturated. Some water is naturally removed by compression through the various stages in the first region.

In embodiments of the invention, a slipstream of fluid from the after-cooled discharge of one stage of compression, typically near or above critical pressure, is expanded to the suction pressure of that same stage, or to a preceding stage should additional temperature reduction be required. The resulting reduced temperature of the expanded slip stream is used to cool the upstream main fluid stream, firstly by heat exchange, if required, and finally by direct mixing of the slipstream with the main fluid stream. The resulting reduction in temperature of the mixed stream condenses additional water from the gas. The amount of cooling required is a function of the minimum water content required for the stream composition to meet the design criteria for water dew point temperature and/or hydrate formation temperature.

The following are examples illustrating embodiments of the invention, more particularly:
Example 1—a basic embodiment;
Example 2—utilizing a low temperature separator vessel (LTS);
Example 3—incorporating a heat exchanger (HEX);
Example 4—a multi-stage isenthalpic embodiment; and
Example 5—a multi-stage isentropic and isenthalpic embodiment.

Examples 1-3 are shown using different stream compositions; more particularly a stream having 100% $CO_2$ and a stream having 80% $CO_2$ and 20% $H_2S$. It will be noted however that embodiments of the invention are applicable to streams having varying amounts of $H_2S$ and including $SO_2$, $NO_x$ and any other gaseous mixtures with relatively large JT Coefficients.

Examples 4 and 5 illustrate the low temperature capabilities of embodiments of the invention as well as the differences between isenthalpic and isentropic processes.

Example 1—Basic

Figure 4A:
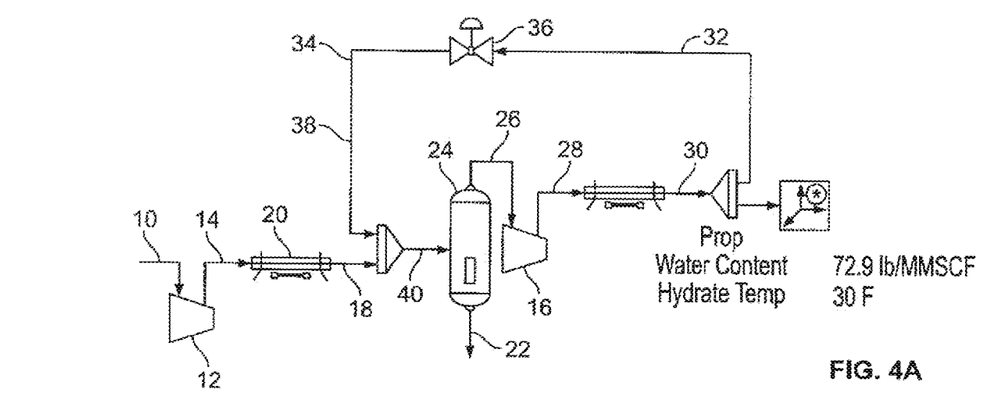
FIG. 4A is a schematic of an isenthalpic dehydration process according to an embodiment of the invention for a water saturated fluid stream comprising 100% $CO_2$.
Figure 4B:
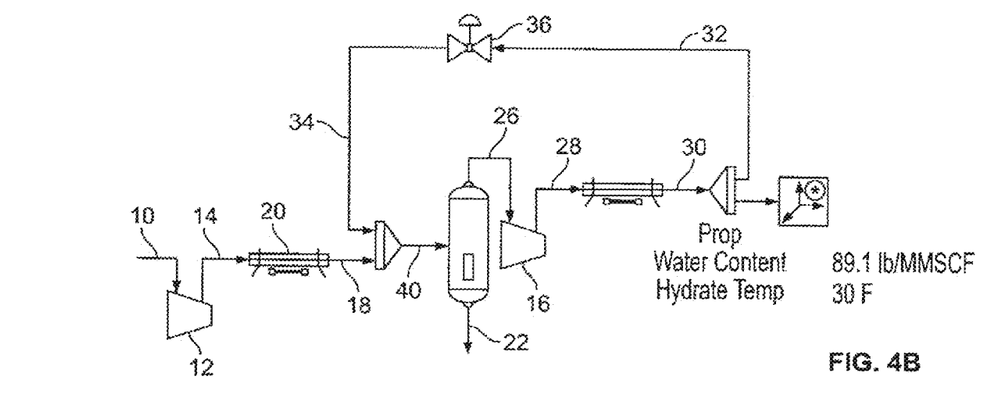
FIG. 4B is a schematic of an isenthalpic dehydration process according to FIG. 4A for a fluid stream comprising 80% $CO_2$ and 20% $H_2S$.

Having reference to FIGS. 4A and 4B, in an embodiment of the invention, a water saturated acid gas feed stream 10 enters a suction stage 12 where it is compressed 14 to the suction pressure of the next stage 16. The hot compressed vapour 14 is cooled 18 with an after-cooler 20 resulting in the condensation of some of the water and other condensables in the feed stream. The condensed liquid containing water is removed 22 in a separator 24 upstream of the final stage of compression. The saturated gas 26 from the separator 24 is further compressed at 28 and is after-cooled again at 30.

A slipstream 32 from the compressed and after-cooled fluid stream is removed and isenthalpically expanded 34 across a Joule-Thomson valve (TCV) 36 to the lower suction pressure of the same stage 16 of compression. The expansion results in a temperature reduction, the magnitude of which is dependent upon the magnitude of the pressure reduction and the composition of the fluid stream. The colder stream 38 is combined with the after-cooled stream 18, exiting the previous stage of compression, resulting in a combined stream 40 having a temperature reduced sufficiently to condense the required amount of water.

As shown in FIG. 4A for a feed stream having 100% $CO_2$, the temperature is reduced to about 87° F. and the final water content is reduced to about 73 lb/MMscf to result in a hydrate formation temperature (HFT) of 30° F.

Referring to FIG. 4B, wherein the feed stream contained 80% $CO_2$ and 20% $H_2S$, the temperature need only be reduced to about 93° F. for a final water content of about 89 lb/MMscf to achieve the same hydrate formation temperature (HFT) of 30° F.

Example 2—Heat Exchanger (HEX)

In cases where the composition of the feed stream, in combination with a large pressure reduction, creates a stream temperature which is below the hydrate formation temperature of the main undehydrated feed stream, the embodiment shown in FIGS. 4A and 4B can be modified to include a heat exchanger (HEX).

Figure 5A:
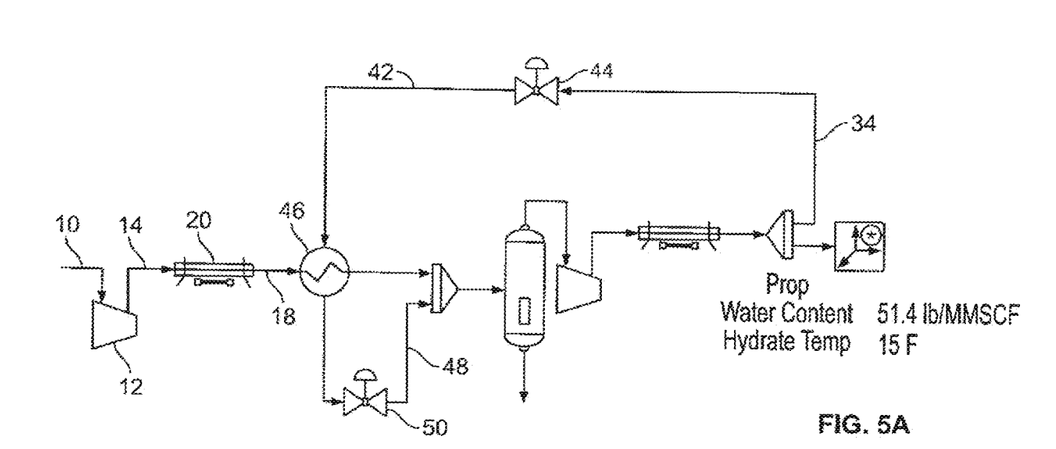
FIGS. 5A and 5B are schematics of an isenthalpic dehydration process according to FIGS. 4A and 4B incorporating a heat exchanger for heating a partially expanded slipstream for preventing hydrate formation in the main process feed stream prior to further expansion of the slipstream to achieve the desired temperature reduction.
Figure 5B:
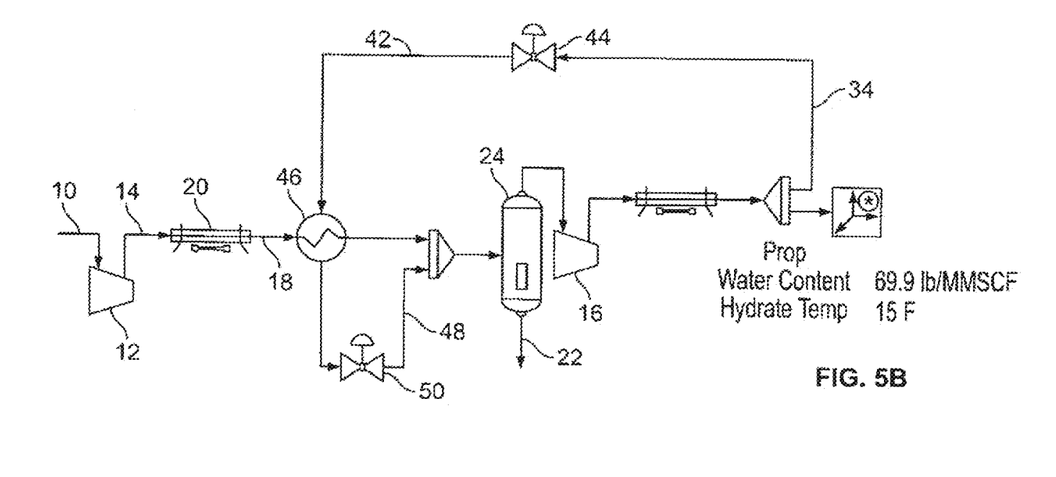

In reference to FIGS. 5A and 5B, the basic embodiment is modified so as to avoid the need for continuous injection of hydrate inhibitor, as is utilized in conventional refrigeration processes.

In FIGS. 5A and 5B, the slipstream 34 is partially expanded 42 across a second Joule-Thomson Valve (JTV) 44. The temperature of the partially expanded stream is thereafter raised in a heat exchanger 46 prior to further expansion of the stream 48 across the Joule-Thomson Valve (TCV) 50. Thus, the temperatures of the partially and fully expanded streams 42, 48 are maintained above the respective hydrate formation temperatures of the main undehydrated feed stream.

For the purposes of Example 2, the design hydrate formation temperature was set at 15° F.

As shown in FIG. 5A, for a feed stream having 100% $CO_2$, the temperature must be reduced to about 73° F. to result in a final water content of about 51 lb/MMscf to achieve the design hydrate formation temperature of 15° F.

With reference to FIG. 5B, and in the case where the feed stream comprises 80% $CO_2$ and 20% $H_2S$, the temperature was reduced to about 79° F. to result in a final water content of about 64 lb/MMscf to achieve the design hydrate formation temperature of 5° F.

Example 3—Low Temperature Separator (LTS)

Figure 6A:
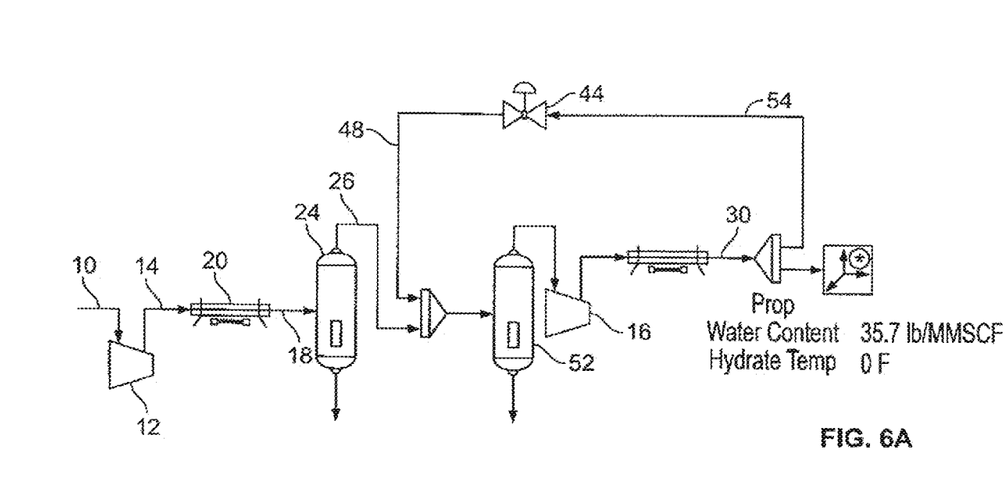
FIGS. 6A and 6B are schematics of an isenthalpic dehydration process according to FIGS. 4A and 4B, incorporating a low temperature separator for removing water from the fluid stream prior to the reintroduction of the slipstream thereto and continuous hydrate inhibitor injection.
Figure 6B:
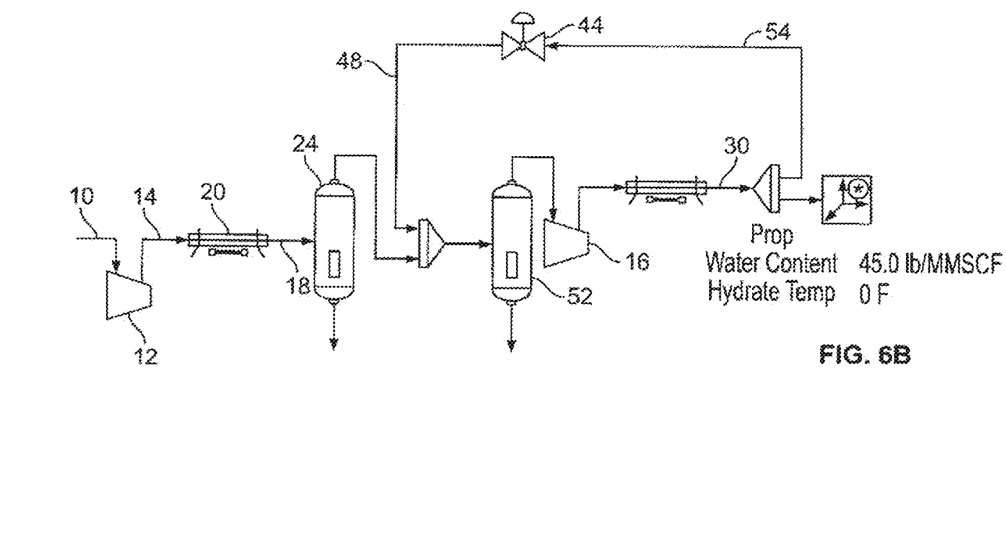

Referring to FIGS. 6A and 6B, an embodiment of the invention utilizes an additional separator where temperature reduction is significant, as an alternate to the embodiment described in Example 2.

As shown in FIGS. 6A and 6B, the 46 and JTV 44 of FIGS. 5A and 5B are replaced with a second low temperature separator (LTS) 52. A slipstream 54 is expanded 56 across a Joule-Thomson Valve (TCV) 44. The first separator 24 is positioned to remove as much water as possible from the feed stream prior to the reintroduction of the expanded slipstream 48. The addition of hydrate inhibitor into the expanded slipstream 48 is considered when the process design requires that the temperature of the expanded slipstream be below 32° F. The early removal of the water reduces the amount of cooling required to meet the design conditions and, should conditions warrant, reduces the amount of hydrate inhibitor required.

The design hydrate formation temperature for Example 3 was set at 0° F.

As shown in FIG. 6A, where the feed stream comprises 100% $CO_2$, the temperature had to be reduced to 62° F. to result in a final water content of about 36 lb/MMscf to meet the design hydrate formation temperature of 0° F.

With reference to FIG. 6B, where the feed stream comprises 80% $CO_2$ and 20% $H_2S$, the temperature had to be reduced to about 67° F. to result in a final water content of about 45 lb/MMscf to achieve the design hydrate formation temperature of 0° F.

Example 4—Multi-Stage Isenthalpic

Figure 7:
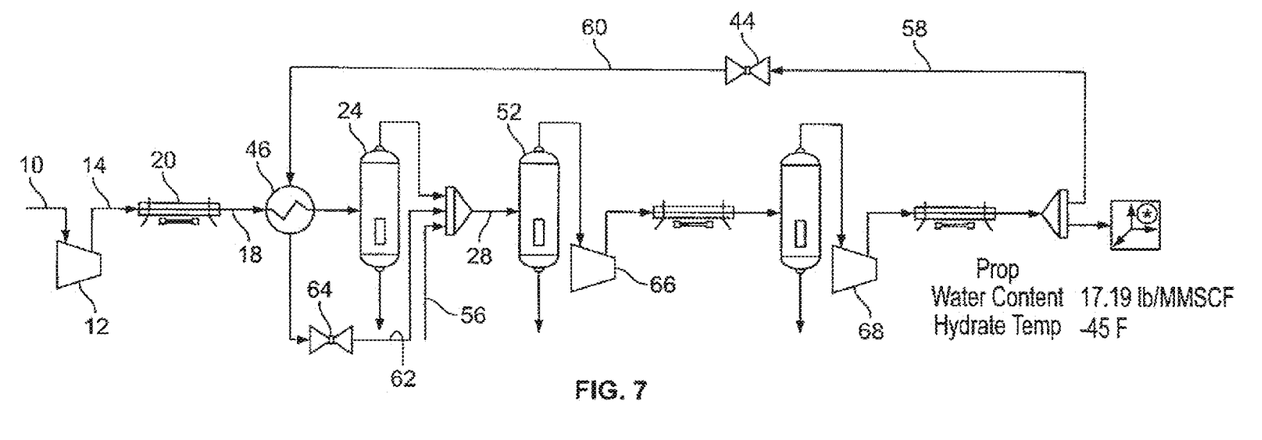
FIG. 7 is a schematic of a multi-stage isenthalpic process according to an embodiment of the invention.

In reference to FIG. 7, a multi-stage embodiment of the invention is employed where the required temperature reduction is very large. The embodiment was designed to achieve a hydrate formation temperature of −45° F.

As shown in FIG. 7, this embodiment comprises a heat exchanger 46, a low temperature separator 52 and continuous hydrate inhibitor injection 56. The first separator 24 is positioned between the heat exchanger 46 and the reintroduction of the temperature reduced stream. The early removal of water from the feed stream reduces the amount of cooling and hydrate inhibitor required to meet the design criteria.

To obtain a lower temperature, the pressure reduction which results from the expansion of the slipstream 58 through the Joule-Thomson Valve 44 occurs over at least two stages of compression. Thus, the partially expanded slipstream 60 is heated at the heat exchanger 46 and fully expanded 62 through the Joule-Thomson Valve 64 to be reintroduced, along with the injection of hydrate inhibitor, to the feed stream two or more stages 66, 68 upstream from the removal of the slipstream 58 for cooling the feed stream 28. Condensed water is removed from the cooled feed stream 28 at the second separator 52 prior to further compression of the cooled feed stream 28.

In this example, the low temperature achieved at the fully expanded slipstream 56 and the cooled feed stream 28 necessitates the addition of the hydrate inhibitor, however the amount of hydrate inhibitor is minimized as a result of the upstream removal of a significant portion of water at the first separator 24.

An additional benefit of the low temperature achieved at the cooled feed stream in this example, is the ability to reduce the number of compression stages from five stages to four stages, resulting in a reduction in the overall cost.

Example 5—Multi-Stage Isentropic

Figure 8:
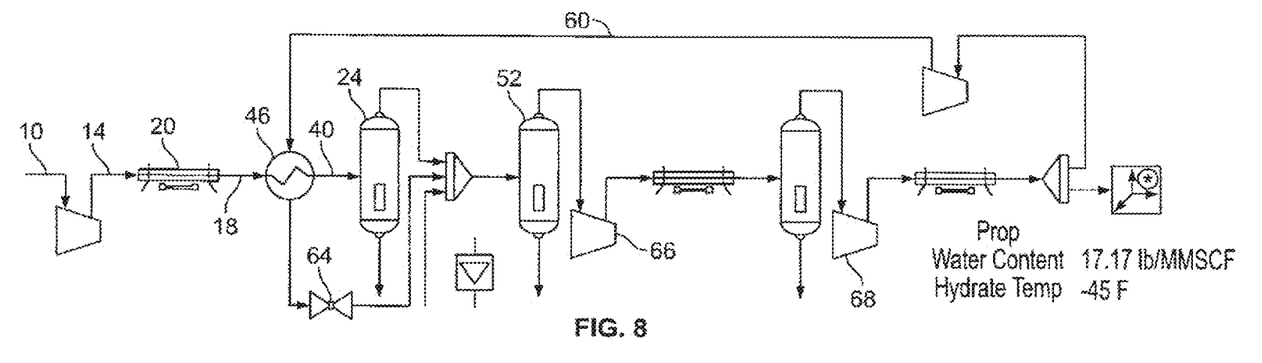
FIG. 8 is a schematic of a multi-stage isentropic process according to an embodiment of the invention wherein one of the Joule-Thomson valves is replaced with an isentropic fluid expander.

With reference to FIG. 8, a multi-stage embodiment of the invention utilizes an isentropic fluid expander 66, such as a conventional radial-expansion turbine or turbo-expander (such as is available from Mafi-Trench, Santa Maria, Calif., USA) to replace the Joule-Thomson Valve 44 of FIG. 7 for expansion of the slipstream 58.

In this embodiment, the isentropic fluid expander is capable of achieving a lower temperature in the expanded slipstream 60 than is possible using a Joule-Thompson valve (isenthalpic expansion) for the same reduction in pressure. Additionally, the slipstream fraction required is smaller than it is in Example 4.

The power requirements for Stage 3 (66) and Stage 4 (68) for this embodiment, compared to that in Example 4, are lower by about 2%. The isentropic fluid expander produces power, about 1.8% of Stage 3 (66) and Stage 4 (68) for other uses. Further, the hydrate inhibitor requirements are minimized.

The embodiments of the invention, described herein have notable advantages over and differences from conventional liquid desiccant and isenthalpic refrigeration dehydration processes.

In comparison to liquid desiccant dehydration processes, embodiments of the invention permit elimination of conventional dehydration equipment by replacement with the expansion valves (TCV, JTV) at a small fraction of the capital cost of the conventional dehydration equipment.

In comparison to conventional isenthalpic expansion refrigeration processes, such as a "Choke Plant" or "DPCU", embodiments of the invention may permit elimination of one stage of compression, a main gas-gas heat exchanger and the addition of hydrate inhibitor, providing a significant reduction to the capital cost.

The prior art "Choke Plant" or "DPCU" requires that the entire gas stream be over-compressed and expanded to the design pressure. This typically increases the original compression power requirements of the system by 20% to 25%. Depending upon the composition of the gas and the operating conditions, the higher compressor discharge pressure may necessitate the addition of an entire stage of compression.

The cooling slipstream is typically 10% to 30% of the combined stream flow through a single stage, depending upon the composition of the acid gas and the required operating conditions. The increase in throughput through one stage of compression theoretically increases the total compression power demand by 2% to 6% (i.e. ⅕ of 10%-30% for a 5 stage compressor). In comparison however, this increase is often comparable to the increase due to the pressure drop through conventional dehydration equipment. Further, there is an efficiency improvement, and therefore a corresponding reduction in compression power, resulting from the reduced operating temperature of the compressor. In some instances, the compression power requirements end up being less than when using conventional dehydration equipment.

Lower suction temperatures, enabled by embodiments of the invention, have an additional advantage over both the conventional dehydrator and the choke plant. The reduced temperature in one stage provides the opportunity to rebalance the compression ratios on each stage, a higher compression ratio where the suction pressure is cooler thus enabling a reduction of the compression ratio in the others, until the discharge temperatures of each stage are relatively equal at some new lower value. The reduction in discharge temperature somewhat reduces the additional power demand arising from the additional slipstream volume seen in one or more stages of compression. The temperature reduction also results in longer valve life, increased operational time and lower maintenance costs. The rebalancing can, at some point, with lower temperatures, be significant enough to eliminate an entire stage of compression and thus provide considerable capital cost saving.

It is believed that the overall carbon footprint of embodiments of the invention is significantly lower than conventional methods. The requirement for equipment is considerably smaller reducing demand for manufacture, there is no need for the formulation of glycol and no additional utilities are required that produce $CO_2$, all of which more than offset the marginal increase in power required (typically about 2%) to compress the slipstream volume. Additionally, the lack of chemical requirements in embodiments of the invention significantly reduces ecological risk.

Acid gases including $CO_2$, $H_2S$, $SO_2$, and $NO_x$ are fluids well suited to the embodiments of the invention. It is believed however that the fluids are not limited to those disclosed herein. It is further believed that the thermodynamic principles utilized in embodiments of the invention are valid for all fluid mixtures exhibiting a positive Joule-Thomson (JT) Coefficient within the desired range of process conditions; in other words, the fluid mixtures cool when expanded. As a generalization, a fluid with a larger JT Coefficient will get colder than one with a smaller JT Coefficient and therefore will require less of the fluid to be slipstreamed. A low slip stream requirement is economically desirable.

Applications for embodiments of the invention lie in carbon capture and storage (CCS), the treatment of $CO_2$, $SO_2$, and $NO_x$ captured from combustion, gasification and industrial chemical processes for sequestration, and in AGI (acid gas injection) where $H_2S$ and $CO_2$ are captured from oil and gas processes for sequestration. Another application for embodiments of the invention appears in the recovery of hydrocarbon liquids from relatively high acid gas content solution gas vapours that are typically processed in Enhanced Oil Recovery (EOR) applications. A further application for embodiments of the invention lie in situations where acid gas dehydration is required in situations with minimal available space or where there is a weight restriction. Such situation might occur in offshore floating production operations or in retrofit applications, both onshore and offshore. The configurations of this invention provide a significant space and weight advantage over other commercial dehydration means.

Examples 1-5 provided herein are based upon a single set of conditions. Embodiments of the invention require optimization for each fluid and set of conditions. Optimization involves the selection of the stage of compression best suited for initiation of the slipstream and which is best suited for recombining the slipstream. Another optimization lies in the selection of the optimum variation of the process whether it be Basic, HEX, LTS, Multi-Stage, Multi-Stage Isentropic, or some other combination of those described above. Also within any of the choices, the optimum instrumentation and control system needs to be included and the optimum operating points for the application established.

Figure 9:
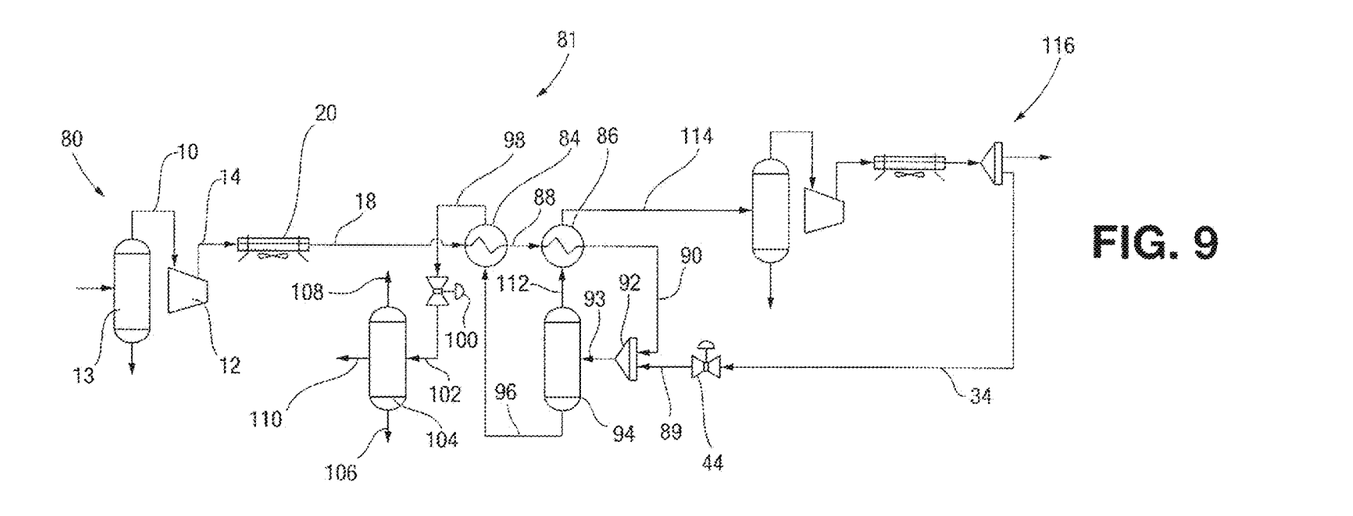
FIG. 9 is a schematic illustration of a further embodiment of the present invention.

Referring to FIG. 9, numeral 80 denotes common upstream operations with numeral 81 denoting the overall schematic process according to a further embodiment.

With respect to the common numerals from the previous embodiments, a separator 13 is provided for separating a feed into saturated gas feed stream 10 which enters compressor 12 where it is compressed to the discharge pressure, compressed vapor 14 is then introduced into after-cooler 20 which results in the condensation of some of the water and other condensables in the feed stream. These unit operations have been discussed herein and previously with respect to the other embodiments.

In respect of the newly presented schematic upstream acid gas stream 18 which is typically from a compressor, well, etc. is normally saturated with water. As an example, the stream may contain 100% acid gases or some other concentration of acid gases with the balance typically being hydrocarbons and low concentrations of other inert gases. For purposes of explanation, the stream may be at for example, 120° F. at a pressure of 600 psi. In this circuit, a pair of heat exchangers 84 and 86 are provided. In terms of the heat exchangers 84 and 86, heat exchanger 84 is a gas-liquid heat exchanger which is used to transfer heat in fluid 18 to the cold liquid fluid 96. Stream 90 mixes with the cooled stream 89 exiting the Joule-Thomson valve 44. The two are mixed in mixing device 92. The so formed mixture 93 at a temperature of approximately 50° F., is passed into low temperature separator 94. At this point, the liquids that condense at the 600 psi pressure form a cold liquid stream 96. Stream 96 will be close to the hydrate formation temperature of the mixture of fluids. If the stream were further depressurized this would most certainly result in the formation of a hydrate. Stream 96 passes into heat exchanger 84, exchanges heat with, stream 18 thereby cooling stream 18 and warming stream 96. It is advantageous for stream 96 to receive some heat from stream 18 to reduce the probability of hydrate formation. It is also advantageous to cool stream 18 to reduce the amount of additional cooling required. Once stream 96 is warmed via heat exchange through exchanger 84, stream 98 is possibly at a temperature of 120° F. The pressure of stream 98 can then be reduced in valve 100 without hydrate formation, to maintain a desired liquid level in the low temperature separator 94. As the liquid level builds, valve 100 opens and allows a stream 102 to pass into a three phase separator 104. Stream 102 is possibly comprised of three phases; vapor, hydrocarbon liquid, and water. The residence time in the separator 104 is sufficient to facilitate the separation of heavier liquids at 106, typically water, vapor at 108 and lighter liquids at 110, typically hydrocarbons. At this point, the separated hydrocarbon liquids 110 can be then directed to an oil treating facility for treatment (not shown), stabilization, and eventual sale.

Returning to the low temperature separator 94, the stream 112 exiting same is a cold acid gas (typically $CO_2$) vapor stream and can be used as an additional source for pre-cooling the main system. Streams 88 and 112 are passed into the heat exchanger 86 which, in this case is a gas-gas heat exchanger used to transfer the heat in stream 88 to the cold vapor stream 112 exiting the low temperature separator 94. This also pre-cools stream 90 exiting the exchanger 86 thereby reducing the amount of additional cooling required. The stream 114 at this point has a temperature of approximately 110° F. from the example noted herein. This system is particularly beneficial in that it allows for hydrocarbon recovery where it is economically feasible.

Stream 114 is then passed into the unit operations that have been described herein previously with respect to the basic overall system.

In the event that there is no possibility, or where it is not economically feasible to recover liquid hydrocarbons, then the designer would employ the system shown in FIG. 10 to be discussed in greater detail herein after. This is also an attractive system for retrofit applications which could use existing compressor arrangements with minimal modifications while also benefiting from the technology set forth herein.

In an EOR application where $CO_2$ is utilized, make-up or additional $CO_2$ is usually mixed with the produced vapor and reinjected into the producing reservoir. Depending upon the pressure of the make-up $CO_2$ stream, it may be mixed with or even replace stream 34 to improve the Joule-Thomson coefficient and to reduce the HFT. The dry, make-up $CO_2$ could be used to minimize or eliminate usage of hydrate inhibitors, such as methanol or glycol, during system start up. The process may be designed to condense fluids other than the hydrocarbons used in this example if so desired.

Additional stages of pressure reduction and separation (duplicating 100, 102 and 104 with 110 replacing 98) may be considered if improved hydrocarbon liquid/vapor separation efficiency is required.

Further, the system may include thermodynamic simulation software to assist in optimizing operating points by predicting water dew point, hydrate formation temperature, and hydrocarbon recovery.

Figure 10:
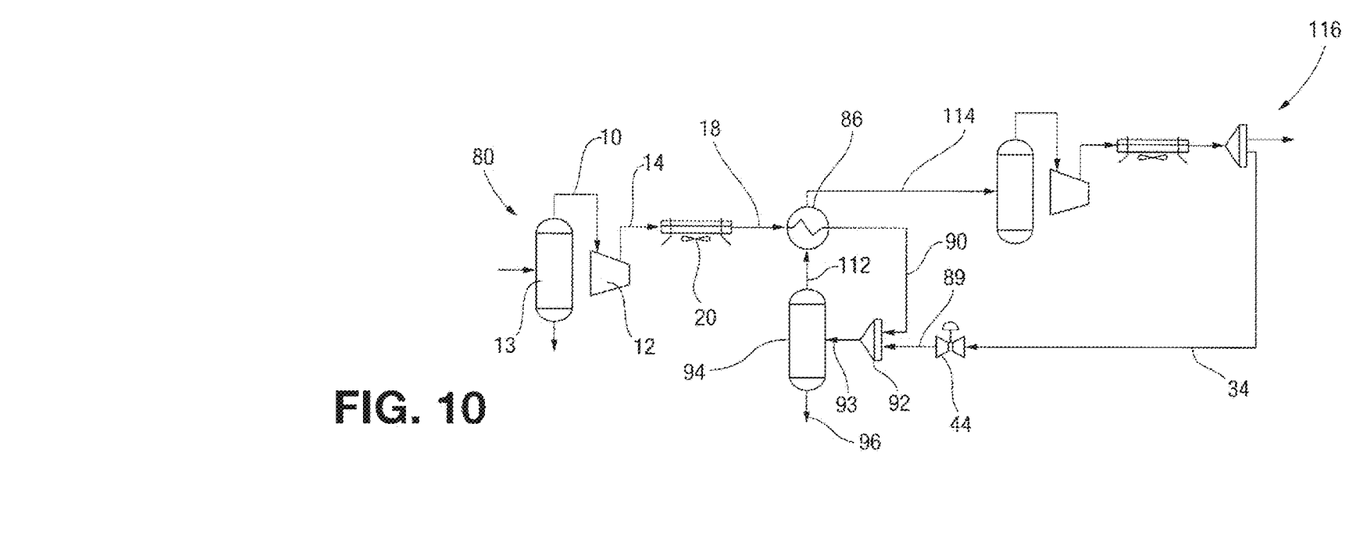
FIG. 10 is a schematic illustration of yet another variation of the technology embraced by the present invention.

Turning to FIG. 10, shown is a further embodiment of the present invention. In this embodiment, it is evident that a significant number of unit operations have been removed relative to that which is shown in FIG. 9. The use of the three phase separator 104 from FIG. 9 is unnecessary in this embodiment as is the gas-liquid heat exchanger. The remaining unit operations are similar to the functioning of operations in FIG. 9 and the overall sequence will be apparent to one skilled in the art.

This embodiment is particularly well suited for existing arrangements where a retrofit is possible to take advantage of the benefits of the system described herein. With the inclusion of the gas-gas heat exchanger, the cooling slipstream is typically reduced to 4% to 10% of the combined stream flow through a single stage, depending upon the composition of the acid gas and the required operating conditions. The increase in throughput through one stage of compression theoretically increases the total compression power demand by 1% to 2% (i.e. ⅕ of 4%-10% for a 5 stage compressor). The addition of the LTS is only required where the metallurgy of the existing suction scrubber is not compatible with the acidic water produced and it is deemed inappropriate to replace the existing scrubber. The capital cost of this embodiment is increased accordingly.

In the embodiment shown in FIG. 10, the heavy liquid phase stream 34 in this instance is typically a warm high pressure recycle stream which is typically super critical (dense phase) or liquid. This is passed into the Joule-Thomson valve 44 which reduces the pressure and therefore the temperature of the stream 34. Cold low pressure recycle stream 89 is used for mixing with the pre-cooled inlet stream 90 into the mixing device 92.

The mixture, as previously discussed with respect to FIG. 9, is denoted by numeral 93. The liquid phase leaving the low temperature separator 94 at 96 is predominantly water. This stream is typically blended elsewhere into a water treatment process.

As an example, stream 90 may be cooled to approximately 60 to 70° F. depending on how much surface area is available in the heat exchanger 86. The slipstream 34 (as discussed herein previously with respect to the other embodiments) may be at 120° F. and possibly at 2,000 psig. This high pressure stream may be depressured in a Joule-Thomson valve 44. Here it is depressured to approximately the same pressure (600 psig) as stream 90. As a result of passing through the Joule-Thomson valve, the stream is expanded and thus cools to approximately 40° F. for purposes of this example. The resulting cold stream 89, is mixed with stream 90 in mixing device 92. The so formed mixture 93 at a temperature of approximately 50° F., is passed into low temperature separator 94. At this point, the liquids that condense at the 600 psi pressure form a cold liquid stream 96. The stream 112 exiting separator 94 is a cold acid gas (typically $CO_2$) vapor stream and can be used as a source for pre-cooling the hot inlet stream 18. Streams 18 and 112 are passed into the heat exchanger 86 which is a gas-gas heat exchanger used to transfer the heat from stream 18 to the cold vapor stream 112 from the low temperature separator 94. This heal exchange also pre-cools stream 90 exiling the exchanger 86 thereby reducing the amount of additional cooling required. The stream 114 at this point has a temperature of approximately 110° F. from the example noted herein.

The invention claimed is:

1. A method for controlling hydrate formation during condensing condensable compounds from a feed stream containing condensable compounds, comprising:
providing a vapour feed stream containing acid gases, hydrocarbons and water as a first step;
forming a cooled liquid stream from said feed stream through a separator as a second step;
maintaining pressure below and temperature above the hydrate formation temperature of the compounds in said cooled liquid stream as a third step;
heating said cooled liquid stream with said feed stream in a gas-liquid heat exchanger to form a heated liquid stream as a fourth step;
reducing pressure of said heated liquid stream without hydrate formation as a fifth step; and collecting vapour, condensed hydrocarbons and water at the reduced pressure as a final step.

2. The method as set forth in claim 1, wherein said cooled liquid stream is heated in said gas-liquid heat exchanger with heat exchange from said feed stream.

3. The method as set forth in claim 1, wherein said vapour, condensed hydrocarbons and water are collected in a secondary separator.

4. The method as set forth in claim 1, wherein said acid gases include $CO_2$, $H_2S$, $SO_x$ and $NO_x$.

5. The method as set forth in claim 1, further including the step of recovering energy between a gas stream from said gas-liquid heat exchanger and a cold acid gas vapour stream from said separator in a gas-gas heat exchanger to heat said cold acid gas stream.

6. The method as set forth in claim 5, further including the step of forming a cooled stream exiting said gas-gas heat exchanger.

7. The method a set forth in claim 1, wherein said feed stream has a positive Joule-Thomson coefficient.

8. The method as set forth in claim 1, wherein said condensed hydrocarbons include $C_5H_{12}$ and heavier hydrocarbons.

9. A method for controlling hydrate formation during condensing condensable compounds from a feed stream containing condensable compounds, providing a vapour feed stream containing $CO_2$, $H_2S$, hydrocarbons and water as a first step;
 forming a cooled liquid stream from said feed stream through a separator as a second step;
 maintaining pressure below and temperature above the hydrate formation temperature of the compounds in said cooled liquid stream as a third step;
 heating said cooled liquid stream with said feed stream in a gas-liquid heat exchanger to form a heated liquid stream as a fourth step reducing pressure of said heated liquid stream without hydrate formation as a fifth step;
 recovering energy between a gas stream from said gas-liquid heat exchanger and a cold acid gas stream from said separator in a gas-gas heat exchanger to heat said cold acid gas stream as a sixth step; and
 collecting vapour, condensed hydrocarbons and water at the reduced pressure as a final step.

10. The method as set forth in claim 9, wherein said cooled liquid stream is heated in said gas-liquid heat exchanger with heat exchange from said feed stream.

* * * * *